US009507119B2

United States Patent
Araki (10) Patent No.: US 9,507,119 B2
(45) Date of Patent: Nov. 29, 2016

(54) VIBRATOR OF VIBRATORY DRIVE UNIT, VIBRATORY DRIVE UNIT, INTERCHANGEABLE LENS, IMAGING DEVICE, AND AUTOMATIC STAGE

(71) Applicant: CANON KABUSHIKI KAISHA, Tokyo (JP)

(72) Inventor: Yasuyuki Araki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/515,272

(22) Filed: Oct. 15, 2014

(65) Prior Publication Data

US 2015/0103424 A1 Apr. 16, 2015

(30) Foreign Application Priority Data

Oct. 16, 2013 (JP) .................................. 2013-215663

(51) Int. Cl.
  *G02B 7/02* (2006.01)
  *G02B 26/00* (2006.01)
  *G02B 7/09* (2006.01)
  *H02N 2/00* (2006.01)
  *H02N 2/02* (2006.01)

(52) U.S. Cl.
  CPC ............... *G02B 7/09* (2013.01); *G02B 7/023* (2013.01); *H02N 2/0015* (2013.01); *H02N 2/0065* (2013.01); *H02N 2/026* (2013.01)

(58) Field of Classification Search
  USPC .............. 359/694–701, 811–830, 200.7, 230
  See application file for complete search history.

(56) References Cited

U.S. PATENT DOCUMENTS

| 4,193,009 A | * | 3/1980 | Durley, III | ............ B06B 1/0618 |
| | | | | 310/317 |
| 2012/0140115 A1 | * | 6/2012 | Kudo | ........................ G02B 7/08 |
| | | | | 348/374 |

FOREIGN PATENT DOCUMENTS

| JP | 9-298892 A | 11/1997 |
| JP | 2004-304887 A | 10/2004 |
| JP | 2011-200051 A | 10/2011 |
| JP | 2011-234608 A | 11/2011 |

\* cited by examiner

*Primary Examiner* — Mohammed Hasan
(74) *Attorney, Agent, or Firm* — Canon USA, Inc., IP Division (57) ABSTRACT

A vibrator including an electro-mechanical transducer and an elastic body that is fixed to the electro-mechanical transducer and that is provided with a projection, the projection having a hollow structure. The projection includes a contact portion having a first surface at a tip, the first surface being parallel to a first plane, a wall portion projecting towards an opposite side with respect to the electro-mechanical transducer, and a connection portion connecting the wall portion and the contact portion to each other. The connection portion having a spring property, and the contact portion includes a portion of which a cross-sectional area in a second plane that is parallel to the first plane increases as an increase of a distance between the portion and the first surface.

18 Claims, 9 Drawing Sheets

VIBRATOR OF VIBRATORY DRIVE UNIT, VIBRATORY DRIVE UNIT, INTERCHANGEABLE LENS, IMAGING DEVICE, AND AUTOMATIC STAGE

BACKGROUND OF THE INVENTION

Field of the Invention

The present invention relates to a vibrator of a vibratory drive unit, a vibratory drive unit, an interchangeable lens, an imaging device, and an automatic stage.

Description of the Related Art

Hitherto, as a linear ultrasonic motor that drives a driven object in a linear manner, a vibratory drive unit (a linear ultrasonic motor) such as the one disclosed in Japanese Patent Laid-Open No. 2004-304887 has been proposed.

The driving principle of such a linear ultrasonic motor will be described with reference to FIGS. 5A, 5B-1, and 5B-2.

Figure 5A:
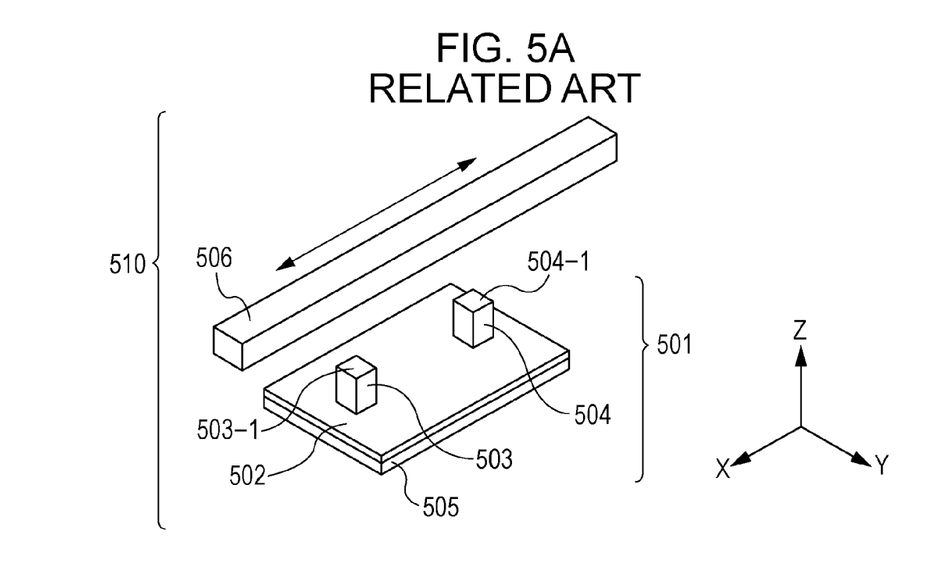
FIG. 5A is an external perspective view of a linear ultrasonic motor of Japanese Patent Laid-Open No. 2004-304887
Figure 5B:
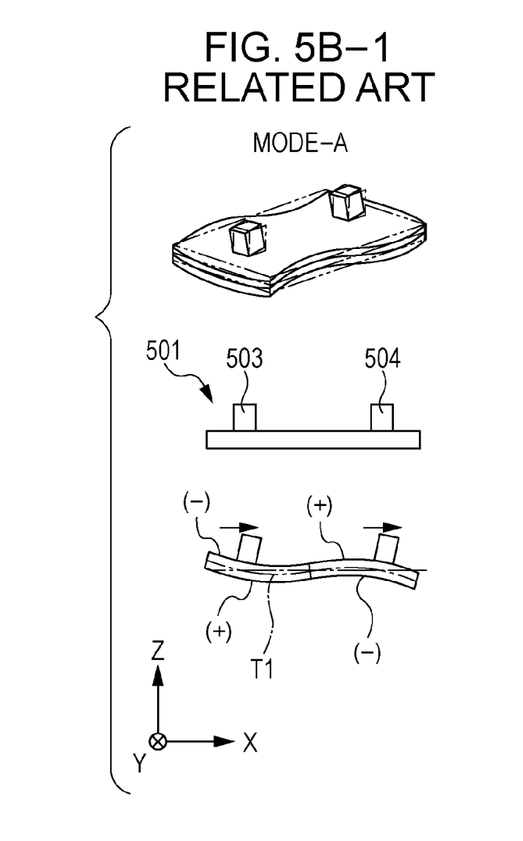
Figure 5B:
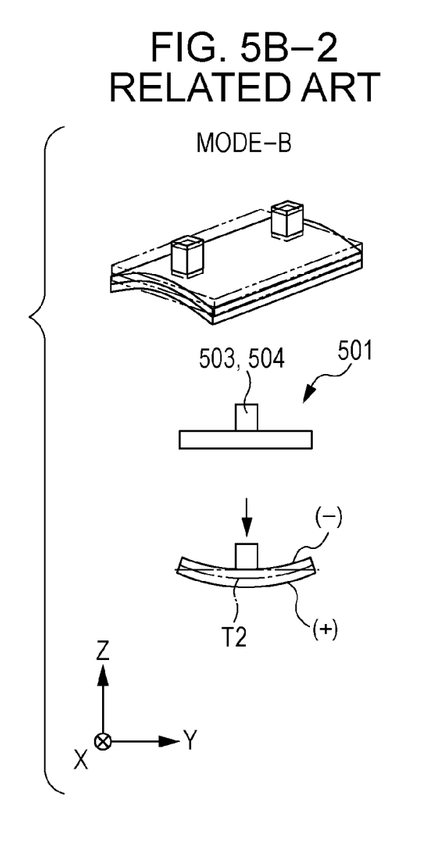

As illustrated in an external perspective view of the linear ultrasonic motor in FIG. 5A, a linear ultrasonic motor 510 includes a vibrator 501, a driven body 506, and a pressure applying member (not shown) that presses the vibrator 501 against the driven body 506.

The vibrator 501 includes an electro-mechanical transducer 505, a representative example of which is a piezoelectric element, an elastic body 502 that is formed in a rectangular shape and that is joined to one side of the electro-mechanical transducer 505 in an integrated manner, and two projections 503 and 504 that are formed in a protruding manner with respect to the upper surface of the elastic body 502.

In the ultrasonic motor, voltages of specific frequencies are applied to the piezoelectric element so that desired vibration modes are multiply excited, and by superposing the vibration modes, a driving vibration is formed.

In the motor of FIG. 5A, two bending vibration modes illustrated in FIGS. 5B-1 and 5B-2 are excited in the vibrator 501. Both of the bending vibration modes are bending vibration modes that vibrate in the out-of-plane direction of the plate-shaped vibrator 501.

One of the vibration modes is a second-order bending vibration mode in the longitudinal direction of the vibrator 501 (Mode-A) and the other one of the vibration modes is a first-order bending vibration mode in the traversal direction of the vibrator 501 (Mode-B).

The shape of the vibrator 501 is designed so that the resonant frequencies of the two vibration modes coincide with each other or approach each other. The projections 503 and 504 are disposed near positions that become nodes of the vibration in Mode-A such that, with the vibration in Mode-A, projection end surfaces 503-1 and 504-1 each performs a pendulum motion with the respective node of the vibration as its fulcrum and, accordingly, reciprocates in the X direction.

Furthermore, the projections 503 and 504 are disposed near positions that become antinodes of the vibration in Mode-B such that, with the vibration in Mode-B, the projection end surfaces 503-1 and 504-1 reciprocate in the Z direction.

By simultaneously exciting and superposing the two vibration modes (Mode-A and Mode-B) so that the vibration phase difference between the two vibration modes approaches ±π/2, the projection end surfaces 503-1 and 504-1 each perform an ellipsoidal motion in the XZ plane.

With the ellipsoidal motions, the driven body 506 that has been brought into press-contact can be driven to one direction.

Note that if the stiffness of the projections of the vibrator is high, there are cases in which an abnormal noise is generated when the motor is driven.

Furthermore, if the stiffness of the projections is too low, there are cases in which power efficiency and the like decreases.

In order to avert the above, the projections need to have an appropriate stiffness.

Figure 6A:
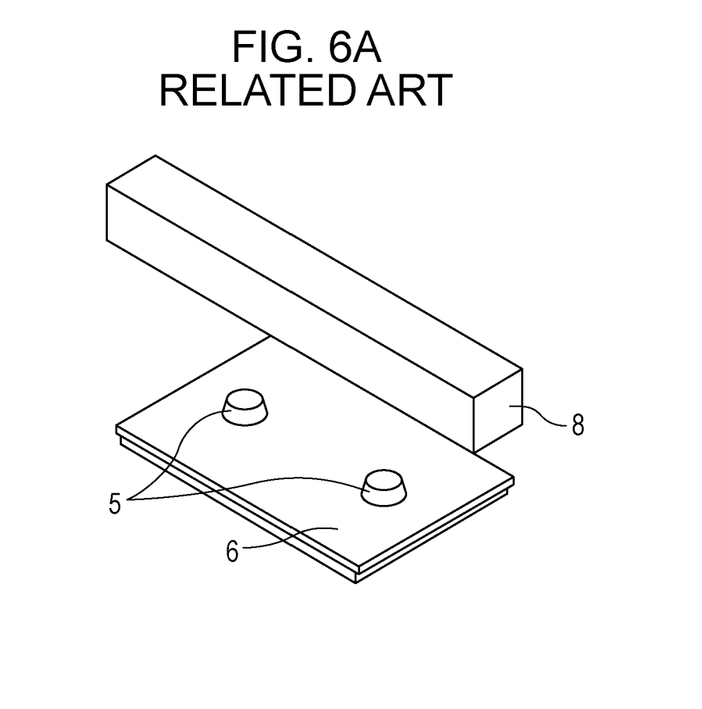
FIG. 6A is an external perspective view of the vibrator and FIG. 6B is a cross-sectional view of a projection of the vibrator.
Figure 6B:
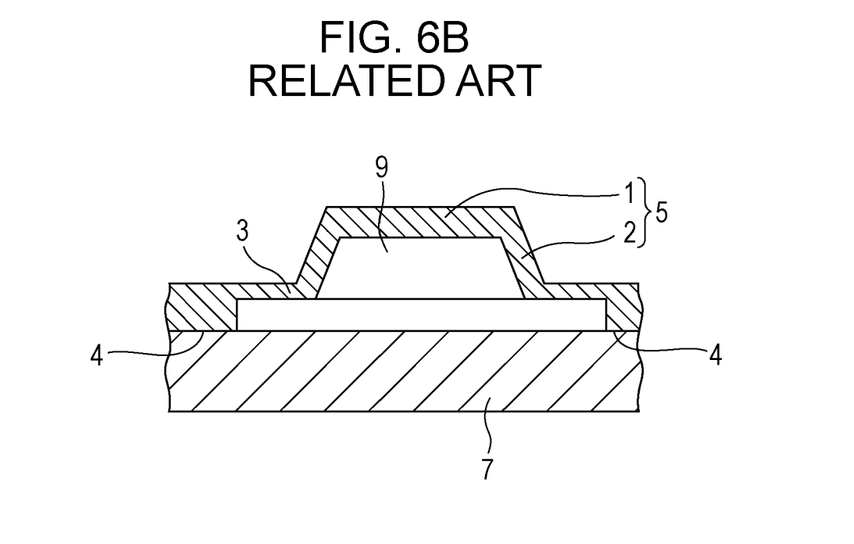

Accordingly, as illustrated in FIGS. 6A and 6B, Japanese Patent Laid-Open No. 2011-200051, for example, proposes a vibratory drive unit that is provided with projections that have a spring property.

Projections 5 each include a contact portion 1 that is in contact with a driven unit 8, a spring portion 3 that has a low stiffness in the direction of pressure applied to the vibrating body, and a standing portion 2 that connects the contact portion 1 and the spring portion 3 to each other.

When force is applied to the contact portion 1 in the Z direction, the spring portion 3 that is thinner than a connection portion 4 that is connected to an electro-mechanical transducer is elastically deformed with the boundary between the connection portion 4 as its fulcrum; accordingly, the contact portion 1 and the standing portion 2 is displaced in the Z direction such that a projection with a spring property can be configured.

Figure 7A:
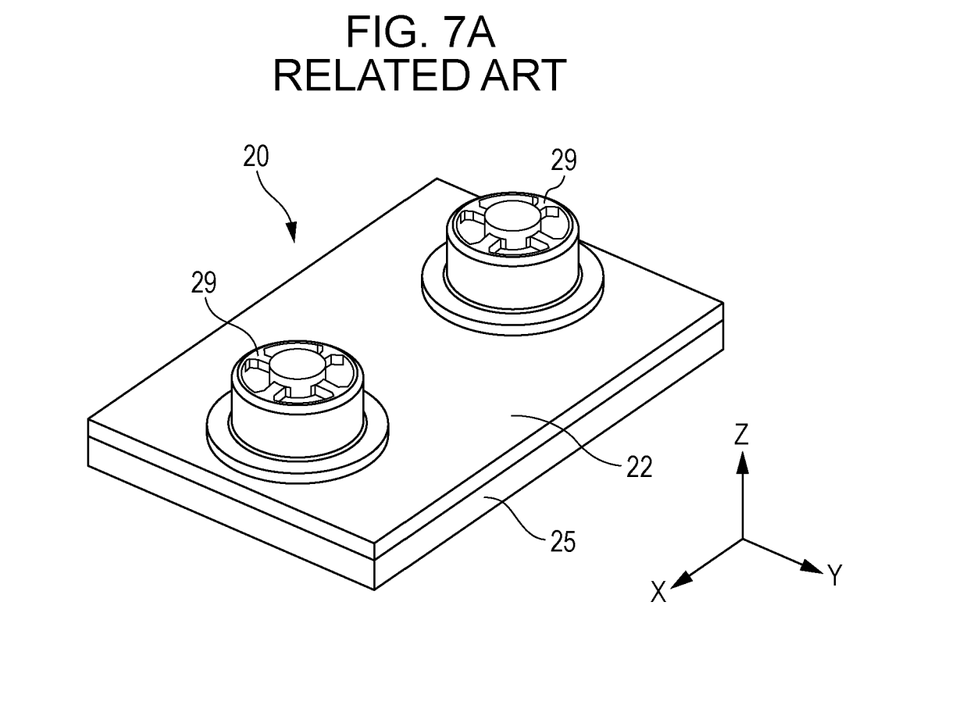
FIG. 7A is an external perspective view of the vibrator and FIG. 7B is a cross-sectional perspective view of a projection of the vibrator.
Figure 7B:
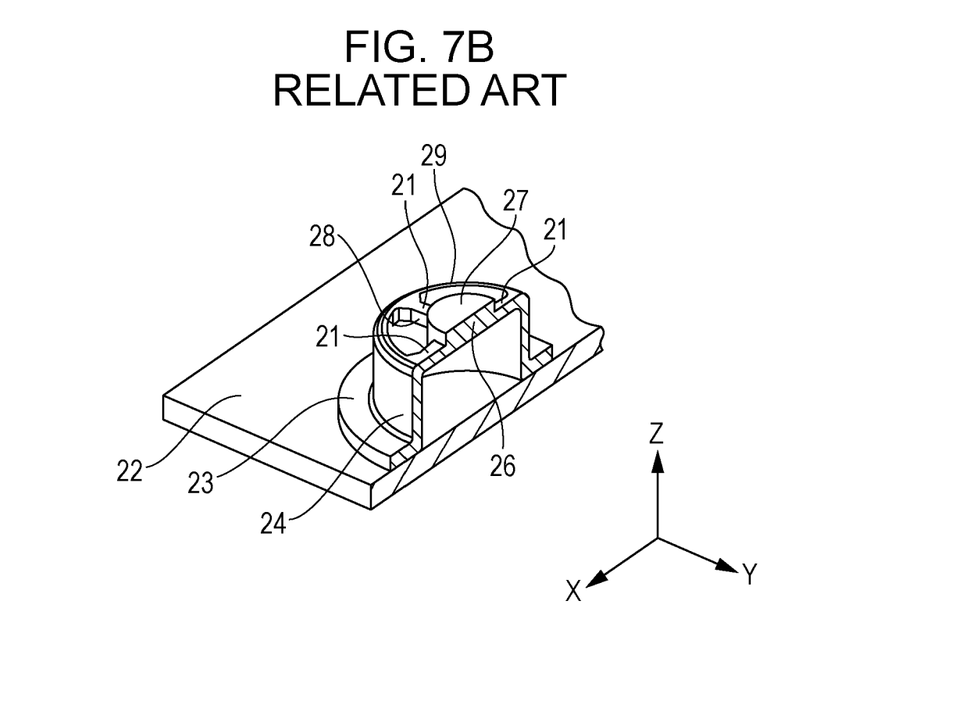

Other than the above, as a vibrator that is provided with projections that have a spring property, Japanese Patent Laid-Open No. 2011-234608 proposes a vibratory drive unit illustrated in FIGS. 7A and 7B.

As illustrated in FIG. 7B, the projection members 29 each include a cylindrical wall portion 24, a contact portion 26 that includes a contact surface 27 that comes in contact with a driven body (not shown), connection portions 21 that connect the wall portion 24 and the contact portion 26 to each other, and a fixation portion 23 that is fixed on the upper surface of an elastic body 22 by laser welding.

Since the wall portion 24 continues throughout the whole circumference of the projection member 29, the projection member 29 has a high stiffness in the directions defined by the XY plane; accordingly, even if the projection member 29 receives reaction force from the driven body in the X direction during a driving operation, there is little deformation. The boundary between each connection portion 21 and the contact portion 26 is a step so that the driven body does not come into contact with the connection portions 21. Furthermore, the thickness of each connection portion 21 is reduced and the width thereof is reduced by dividing the connection portions 21 into four sections with the hole portions 28; accordingly, the stiffness in the Z direction is reduced such that the connection portions 21 are provided with a spring property.

Figure 8A:
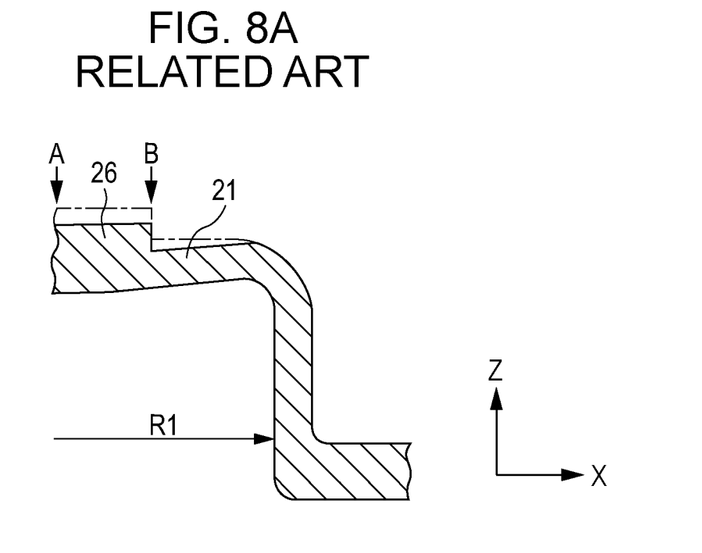
FIGS. 8A and 8B are each a cross-sectional view illustrating half of a projection to which pressure has been applied.

FIG. 8A is a cross-sectional view illustrating half of the shape of the projection member 29 before and after the deformation when, in the vibrator illustrated in Japanese Patent Laid-Open No. 2011-234608, a pressure is applied to the contact portion 26 of the projection member 29 in the negative direction of the Z-axis.

When a pressure is applied to the contact portion 26 in the negative direction of the Z-axis, the contact portion 26 and the connection portions 21 become deformed. Such a configuration gives the projection member 29 a spring property in the Z direction. If the stiffness of the projection member 29 is high, a beating sound will be generated when the projection member 29 is brought in contact with the driven body, and when the stiffness is low, even if the vibrator is not generating any force in the desired direction, the projection member 29 will be in contact with the slider and efficiency will be degraded.

In order to prevent generation of an abnormal noise and degradation in efficiency, the thickness and the like of each connection portion 21 are set to appropriate values.

Figure 8B:
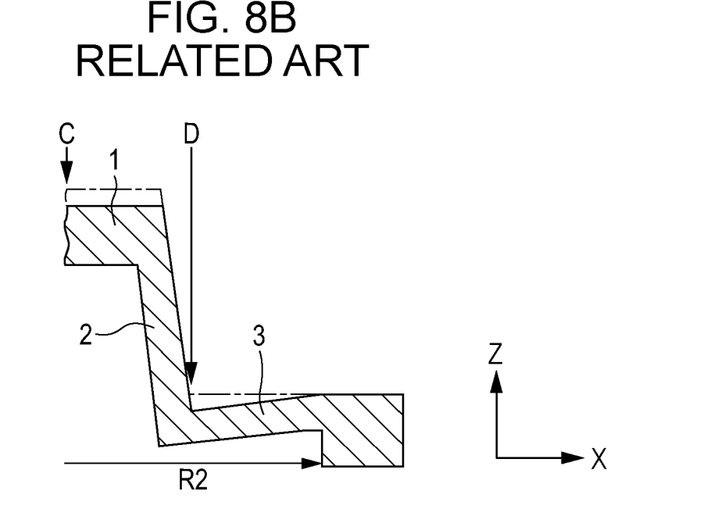

As illustrated in FIG. 8B, in the vibrator illustrated in Japanese Patent Laid-Open No. 2011-200051, only the spring portion 3 is mainly deformed. Accordingly, the contact portion 1 and the standing portion 2, in other words, the portion between C and D does not contribute to the spring stiffness.

Accordingly, in order to obtain an appropriate stiffness, the radius R2 of the non-contact portion between the elastic body and the piezoelectric element becomes large. As a result, the adhesion area between the elastic body and the piezoelectric element becomes small, and the elastic body and the piezoelectric element become susceptible to peeling and the like; accordingly, there are cases in which a desired vibration cannot be generated.

On the other hand, in the shape illustrated in FIG. 8A, the radius R1 of the non-contact portion between the elastic body and the piezoelectric element is determined by the lengths of the contact portion 26 and the connection portion 21.

Now, since both the contact portion 26 and the connection portion 21 deform, different from the shape illustrated in FIG. 8B, in the area of the projection constituting the non-contact portion, there is no portion that does not contribute to reduction of the spring stiffness in the Z direction; accordingly, the radius R1 of the non-contact portion between the elastic body and the piezoelectric element can be reduced.

As a result, the adhesion area between the elastic body and the piezoelectric element can be increased.

Furthermore, when the shape of the projection is integrally formed by press-forming, such as by drawing, since it is easier to carry out processing with a larger draw radius, the shape illustrated in FIG. 8A, in which the length R1 is larger than the length between C and D illustrated in FIG. 8B, can be processed more easily.

The projections of the vibrator and the driven body are in contact with one another intermittently. At this time, since the amplitude of each projection is in the order of micrometers, the contact surface of the driven body and the contact surfaces of the projections need to be smooth surfaces in order to drive the driven body in an accurate manner.

Accordingly, the surfaces of both contact portions are finished to a smooth surface by lapping. As a result, since lapping is performed, the wall thickness of the contact portion becomes thin accordingly.

Now, in the projections illustrated in Japanese Patent Laid-Open No. 2011-234608, because the contact portions are deformed as well upon application of pressure, the spring stiffness changes when the wall thickness of each contact portion decreases.

In order to increase mass productivity, a plurality of elastic bodies need to be lapped at the same time; accordingly, the following issues are encountered.

That is, since the dimension and the warp of each piece of elastic body formed by press working varies, even if lapped in the same manner, the amount of lapping changes by each piece. When the lapping amount varies by each piece, the spring stiffness also varies such that ones with high stiffness and ones with low stiffness are created.

For example, when the lapping amount is small, the stiffness of the projection becomes too high and abnormal noise will be generated during the driving operation and when the lapping is performed excessively, the stiffness of the projection becomes too low and there are cases in which power efficiency and the like decrease. The decrease in the stiffness of the projection also occurs when the contact portion of the projection is worn away after a long period of driving operation.

SUMMARY OF THE INVENTION

An aspect of the present invention relates to a vibrator of a vibratory drive unit that includes an electro-mechanical transducer and an elastic body that is fixed to the electro-mechanical transducer and that is provided with a projection having a hollow structure, wherein the projection includes a contact portion having a first surface at a tip, the first surface being parallel to a first plane, a wall portion projecting towards an opposite side with respect to the electro-mechanical transducer, and a connection portion connecting the wall portion and the contact portion to each other, the connection portion having a spring property, and the contact portion includes a portion of which a cross-sectional area in a second plane that is parallel to the first plane increases as an increase of a distance between the portion and the first surface.

The disclosure of the present application includes a vibrator of a vibratory drive unit, a vibratory drive unit, and either one of an interchangeable lens, an imaging device, and an automatic stage that includes the vibratory drive unit that have little change in the spring stiffness, that can perform a stable driving operation, and that can improve power efficiency, even if the contact portion is worn away due to lapping and driving of the motor.

Furthermore, in the present description, the contact surface of the projection in contact with the driven body denotes a flat surface that includes minute contact points between the projection and the contacted body and refers to a flat surface including a number of contact points. Furthermore, parallel to or orthogonal to a plane includes a state that is completely parallel to or orthogonal to a plane, as well as a state that is substantially parallel to or orthogonal to a plane. The term substantially refers that, for example, when a surface is denoted as substantially parallel to another surface, the surfaces are in a parallel state within the range that allows the vibrator of the vibratory drive unit to exert a function sufficient for practical use.

Further features of the present invention will become apparent from the following description of exemplary embodiments with reference to the attached drawings.

BRIEF DESCRIPTION OF THE DRAWINGS

FIGS. 1A to 1C are diagrams for describing a vibrator in which

FIGS. 3A and 3B illustrate shapes of the projections that are used in the calculation of FIG. 2A, in which

FIGS. 5A, 5B-1, and 5B-2 are diagrams for describing the driving principle of a linear ultrasonic motor, in which FIGS. 5B-1 and 5B-2 are diagrams illustrating vibration modes excited in a vibrator of the linear ultrasonic motor.

FIGS. 6A and 6B are diagrams for describing the configuration of a vibrator of Japanese Patent Laid-Open No. 2011-200051, in which

FIGS. 7A and 7B are diagrams for describing the configuration of a vibrator of Japanese Patent Laid-Open No. 2011-234608, in which

DESCRIPTION OF THE EMBODIMENTS

Exemplary configurations of the vibratory drive unit according to the embodiments of the present invention will be described next with reference to the following embodiments.

First Embodiment

As a first embodiment, an exemplary configuration of a vibrator of a vibratory drive unit applying the present invention will be described. The vibrator of the vibratory drive unit of the present embodiment includes a rectangular-shaped electro-mechanical transducer and an elastic body that is fixed to the electro-mechanical transducer and that is provided with projections with a hollow structure.

Application of an AC voltage to the electro-mechanical transducer excites an ellipsoidal motion in the projections, and a driven body that is in contact with the projections is relatively displaced.

Figure 1A:
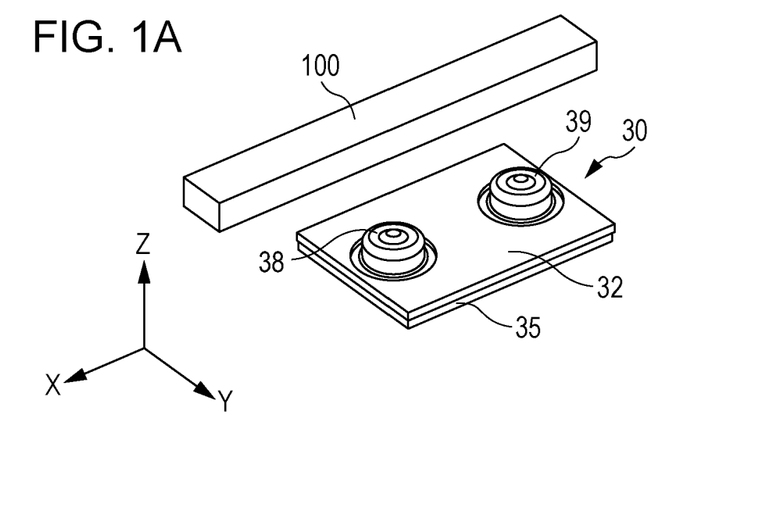
FIG. 1A is an external perspective view of the vibrator and a driven body.
Figure 1B:
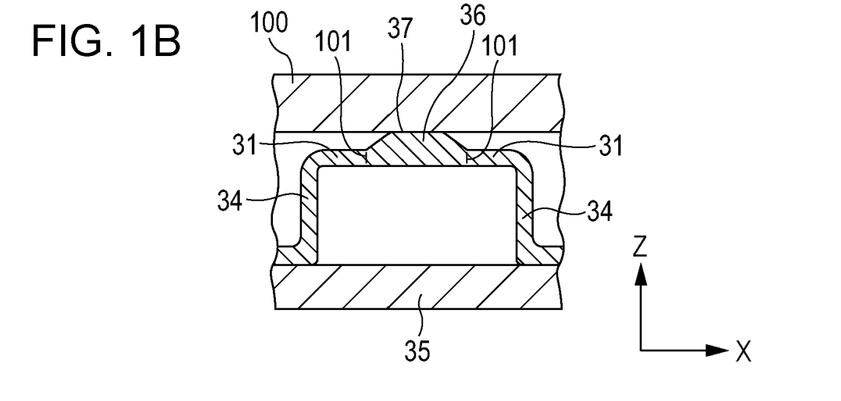
FIG. 1B is a cross-sectional view of a vicinity of a projection when the vibrator and the driven body are in contact with each other.

FIGS. 1A and 1B are diagrams for explaining the vibrator of the vibratory drive unit of the present embodiment in which FIG. 1A is a perspective view of the vibrator and the driven body and FIG. 1B is a cross-sectional view of the vibrator and the driven body in the vicinity of the projection.

As illustrated in FIG. 1A, a vibrator 30 includes a piezoelectric element 35, an elastic body 32, and two projections 38 and 39 that are provided on the upper surface of the elastic body 32 in a projecting manner.

The projections 38 and 39 and the elastic body 32 are integrally formed by machining, for example, by integrally forming the projections 38 and 39 and the elastic body 32 from a single piece of material by work such as press working; however, the projections 38 and 39 may be fixed on the upper surface of the elastic body 32 by, for example, laser welding.

During a driving operation, a driven body 100 and the vibrator 30 are in press-contact with each other through the projections 38 and 39. When an AC electric field is applied to the piezoelectric element 35, two bending vibration modes are excited in the vibrator 30. In other words, the two vibration modes include a first bending mode and a second bending mode in which nodal lines thereof are substantially orthogonal to each other. With the two vibration modes, an ellipsoidal motion is excited in the contact surfaces (first planes) of the projections 38 and 39. As a result, the driven body 100 that is in press-contact with the projections 38 and 39 receives a frictional driving force and is driven. The driving principle of the above is similar to the driving principle described in the example of the related art and, thus, description thereof of is omitted.

A configuration of the projections will now be described.

In the present embodiment, since the projections 38 and 39 have the same shape, a description of the projection 39 will be given.

As illustrated in FIG. 1B, the projection 39 includes a contact portion 36 that includes a contact surface 37 that is in contact with the driven body 100, a wall portion 34 that projects towards the opposite side with respect to the electro-mechanical transducer, and a connection portion 31 that connects the wall portion 34 and the contact portion 36 to each other. The wall portion 34 has, for example, a cylindrical shape.

Since the wall portion 34 continues throughout the whole circumference of the projection 39, the projection 39 has high rigidity in the directions defined by the XY plane; accordingly, even if the projection 39 receives reaction force from the driven body in the X direction during a driving operation, there is little deformation.

The boundary between the contact portion 36 and the connection portion 31 is defined as a boundary line 101, provided for convenience of description, that is parallel to the Z-axis. The portion between the connection portion 31 and the driven body 100 is a gap so that the driven body 100 does not come into contact with the connection portion 31.

Furthermore, the thickness of the connection portion 31 has been reduced so that the stiffness of the connection portion 31 is low in the Z direction; accordingly, the connection portion 31 is provided with a spring property.

Similarly, the contact portion 36 also has a spring property such that the contact portion 36 is bent and deformed when pressure is applied thereto.

Figure 1C:
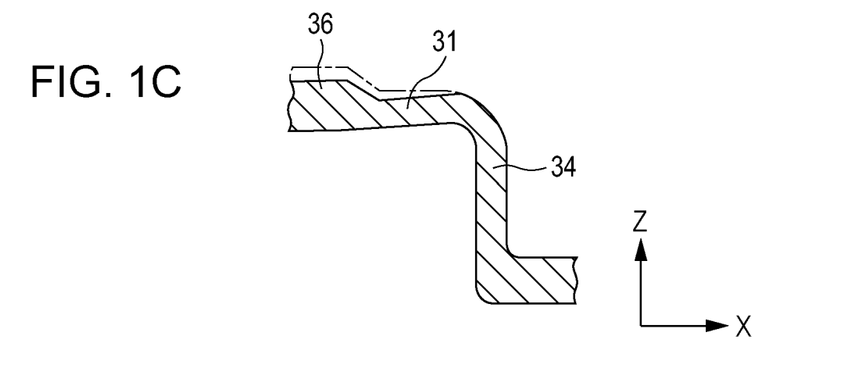
FIG. 1C is a cross-sectional view illustrating half of a deformed projection.

With reference to FIG. 1C that is a cross-sectional view illustrating half of the projection, a state of the projection after deformation will be described.

When a pressure is applied to the contact portion 36 in the negative direction of the Z-axis, the contact portion 36 and the connection portion 31 are deformed with the boundary between the wall portion 34 and the connection portion 31 as a fulcrum. Such a configuration gives the projection 39 a spring property in the Z direction.

If the stiffness of the projection 39 is high, a beating sound will be generated when the projection 39 is brought in contact with the driven body, and when the stiffness is low, even if the vibrator is not generating any force in the desired direction, the projection 39 will be in contact with the slider and efficiency will be degraded. In order to prevent generation of an abnormal noise and degradation in efficiency, the thicknesses of the contact portion 36 and the connection portion 31 are set to appropriate values.

The thickness of the connection portion 31 is substantially uniform. The contact portion 36 has a portion in which the cross-sectional areas of the contact portion taken along the XY planes (second planes that are parallel to the first planes) become larger the farther away from the contact surface side, and the contact portion includes non-uniform portions in which the thicknesses at some portions are non-uniform. In other words, the cross-sectional shape of the contact portion in the XZ plane (a plane that includes therein the driving direction of the vibrator 30 and the direction in which the projection 39 is projected, in other words, a third plane that is perpendicular to the first planes) includes a substantially trapezoid shape. A substantially trapezoid shape not only includes a trapezoid shape itself but also includes a shape that is similar to a trapezoid shape in which some of the sides and corners are curved or rounded, for example.

Figure 2A:
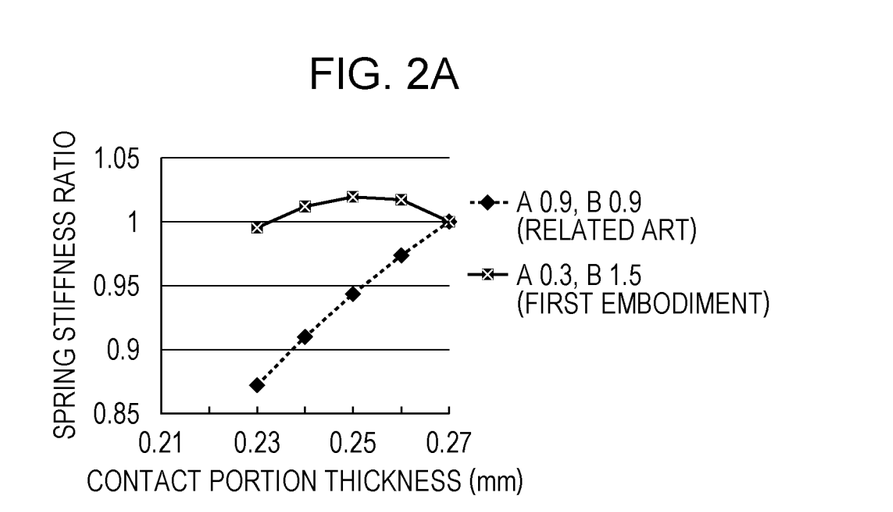
FIG. 2A is a diagram illustrating a relationship between a thickness of a contact portion of the projection and a change ratio of a spring stiffness.

The relationship between the thickness of the contact portion and the spring stiffness ratio of the contact portion 36 is illustrated in FIG. 2A.

The thickness of the contact portion refers to the maximum thickness of the contact portion in the Z-axis direction. Lapping of the contact portion and driving of the driven body wears the contact portion and, accordingly, the thickness of the contact portion decreases. It has been obtained by experiment that, with the type of vibratory drive unit of the present invention, the permissible range of reduction in the contact portion thickness due to wear is 40 μm or less.

The spring stiffness of the contact portion that has not been lapped and that is not worn is given as 1. The spring stiffness is calculated by obtaining, by FEM analysis, the displacement amount of the contact portion along the central axis of the projection when a pressure is applied in the Z direction.

Figure 3A:
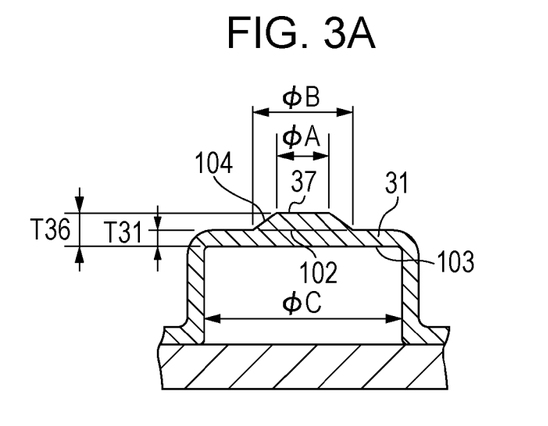
FIG. 3A illustrates a shape of a first embodiment of the present invention and FIG. 3B illustrates a shape of the related art.

The plots connected by the solid line are plots of the contact portion having a shape of the present embodiment. As illustrated in FIG. 3A, a diameter ϕA of the end surface 37 of the contact portion and a diameter ϕB of a root surface 102 that constitutes the diameter which is the largest among the diameters, the axis of which extends in the Z direction, of the contact portion are different. The diameter ϕA is 0.3 mm and ϕB is 1.5 mm.

Figure 3B:
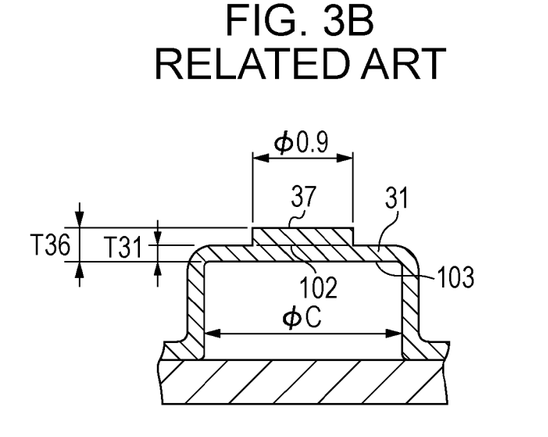

Meanwhile, the plots connected by the dotted line are plots of the contact portion having a conventional shape illustrated in FIG. 3B. The diameter ϕA of the contact surface 37 of the contact portion and the diameter ϕB of the root surface 102 that constitutes the diameter which is the largest among the diameters, the axes of which extends in the Z direction, of the contact portion are the same, that is, 0.9 mm. As regards the contact portion thickness T36 of the contact portion and the thickness T31 of the connection portion 31, those of the present embodiment and those of the conventional shape have the same dimensions.

Note that the thickness of the connection portion is a distance between a lower surface 103 of the connection portion, which is the surface of the connection portion 31 on the piezoelectric element side, and the root surface 102.

With the conventional shape, compared to a case in which the contact portion thickness T36 is 0.27 mm, in a case in which the contact portion T36 becomes 0.23 mm due to lapping and wear, the spring stiffness is 0.87 times stiffer: the change ratio of the spring stiffness is large.

On the other hand, with the shape of the present embodiment, even if the thickness T36 becomes 0.23 mm from 0.27 mm due to lapping and wear, the spring stiffness changes within the range of 0.995 times to 1.017 times: the change ratio of the spring stiffness is small, that is, the change ratio is 2% or lower.

This is because, in contrast with the conventional shape in which the thickness of the contact portion 36 is uniform and the contact area thereof is the same, in the case of the present embodiment, the diameter of the root surface is five times larger than the diameter of the end surface of the contact portion and, accordingly, even if the thickness of the contact portion 36 decreases, because the area of the contact surface that applies pressure increases, the pressure applying force is dispersed in the diameter direction and the surface pressure becomes low.

The above also utilizes the fact that deformation is, under the same surface pressure, small on the outer peripheral side compared with the inner peripheral side since the distance from the fulcrum to the power point in the case of the outer peripheral side is shorter than the distance from the fulcrum to the power point in the case of the inner peripheral side.

Figure 2B:
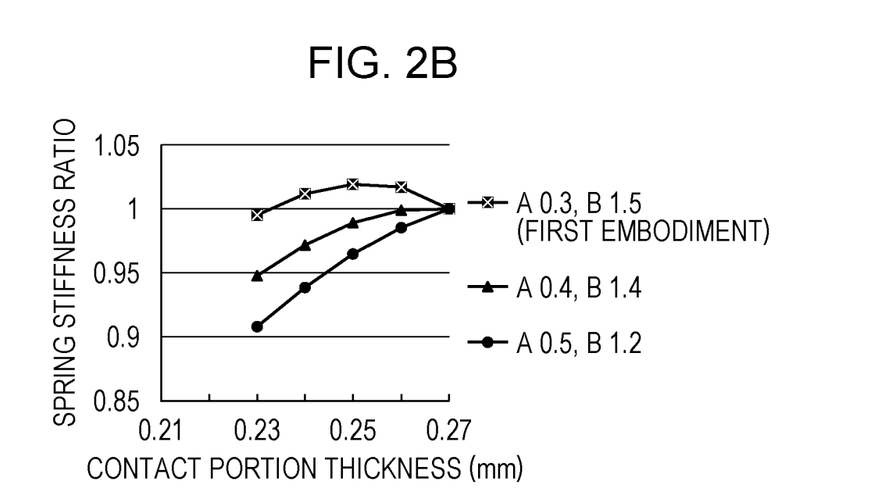
FIG. 2B is a diagram illustrating a relationship between dimensions ΦA and ΦB of the contact portion and the change ratio of the spring stiffness.

As illustrated in FIG. 2B, with the dimension and shape of the present embodiment, as ϕA/ϕB becomes smaller, the change ratio of the spring stiffness becomes smaller, and when ϕA/ϕB becomes small to the extent to which ϕA is 0.3 mm and ϕB is 1.5 mm, some contact portion thicknesses will exhibit a spring stiffness ratio that is larger than 1, even if the thickness of the contact portion decreases.

It has been confirmed by experiment that, in the present embodiment, if the change in the spring stiffness of the projection is 10% or lower, there is almost no decrease in speed and almost no increase in power consumption.

The dimension of the contact portion in which the change ratio of the spring stiffness of the projection is about 10% when the thickness of the contact portion is decreased to a range of 40 μm or lower is, as for ΦA, 0.5 mm, and as for ΦB, 1.2 mm and the diameter of the root surface is 2.4 times larger than the diameter of the end surface of the contact portion.

In other words, in order to set the change ratio of the spring stiffness of the projection to 10% or under, the diameter of the root surface needs to be 2 times or more with respect to the diameter of the end surface of the contact portion.

Figure 4:
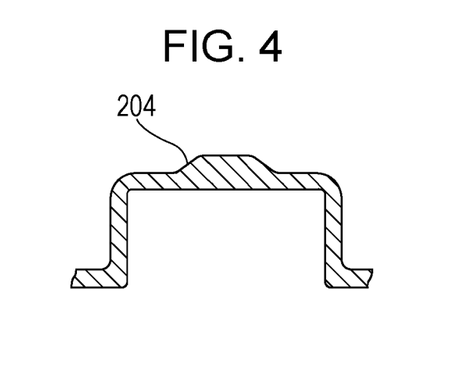
FIG. 4 is a diagram illustrating another example of a shape of the projection of the vibrator.

In the actual design, the values of ϕA and ϕB are determined by, for example, the assumed variation of the lapping amount, the assumed wear amount, and the permissible range of the change ratio of the spring stiffness. An inclined portion 104 of the contact portion illustrated in FIG. 3A is not limited to a smooth surface and, for example, as in the cross sectional shape of the contact portion illustrated in FIG. 4, an inclined portion 204 may include a curved portion.

By having the above configuration, a vibrator of a vibratory drive unit which has little change in its spring stiffness can be obtained even if the contact portion is worn away by lapping and by driving of the motor. Furthermore, a vibrator of a vibratory drive unit or a vibratory drive unit that is capable of performing stable driving operations can be obtained. Still further, power efficiency of the vibrator of the vibratory drive unit or the vibratory drive unit can be improved.

Second Embodiment

In the second embodiment, as an application example of the vibratory drive unit of the present invention, an example in which a vibratory drive unit that is built in a lens barrel of an imaging device (an optical apparatus), such as a camera, and that drives a lens (an imaging element) for autofocusing will be described with reference to FIG. 9.

Figure 9:
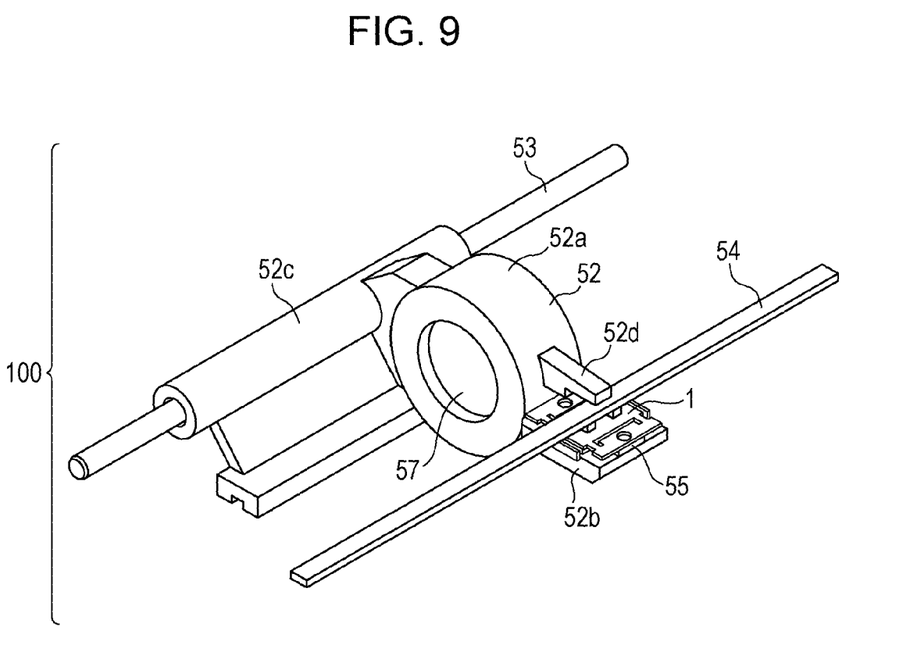
FIG. 9 is a diagram for describing an exemplary configuration of an imaging device.

FIG. 9 is a diagram for describing a drive mechanism unit of the lens of the lens barrel.

The drive mechanism of the driven body according to the vibratory drive unit of the present embodiment includes the vibratory drive unit (the vibrator and the driven body) of the first embodiment, and a first guide bar and a second guide bar that are provided parallel to each other and that slidably hold the driven body.

Relative displacement force is generated between the vibrator and the second guide bar that is in contact with the projections of the elastic body by an ellipsoidal motion of the projections of the vibrator that is generated by application of a drive voltage to an electro-mechanical transducer. The above configuration allows the driven body to be displaced along the first and second guide bars.

Specifically, as illustrated in FIG. 9, a drive mechanism 100 of the driven body that employs the vibratory drive unit of the present embodiment mainly includes a lens holder 52 that is a lens holding member, a lens 57, a vibrator 1 on which a flexible printed board is bonded, a pressure applying magnet 55, two guide bars 53 and 54, and a main body (not shown).

The two ends of each of a first guide bar 53 and a second guide bar 54 constituted by two guide bars are held by and fixed to the main body (not shown) so that the first guide bar 53 and the second guide bar 54 are disposed parallel to each other.

The lens holder 52 includes a cylindrical holder portion 52a, a holding portion 52b that holds and fixes the vibrator 1 and the pressure applying magnet 55, a first guide portion 52c that is fitted with the first guide bar 53 so as to function as a guide.

The pressure applying magnet 55 that is configured as a pressure applying unit includes a permanent magnet and two yokes that are disposed at the two sides of the permanent magnet. A magnetic circuit is formed between the pressure applying magnet 55 and the guide bar 54 such that attractive force is generated between the two components. A space is provided between the pressure applying magnet 55 and the guide bar 54. The guide bar 54 is disposed so as to be in contact with the vibrator 1. Pressure applying force is created between the guide bar 54 and the vibrator 1 with the attractive force described above.

Two projections provided on the elastic body are in press-contact with the second guide bar 54 such that a second guide portion is formed. The second guide portion utilizes the attractive force of magnetism to form a guide mechanism. Although there are cases in which the vibrator 1 and the guide bar 54 are separated from each other due to reception of external force, the above is dealt with by the following measure. That is, a measure is employed so that the lens holder 52 is returned to its desired position upon a fall prevention unit 52d that is provided in the lens holder 52 hitting the guide bar.

By providing a desirable electric signal to the vibrator 1, a driving force is generated between the vibrator 1 and the guide bar 54, and with this driving force, driving of the lens holder is performed.

In the present embodiment, although an example of a pressure applying mechanism employing a magnet has been described, the pressure applying mechanism may be a spring, and the configuration may be such that pressure is applied to the vibrator 1 and the second guide bar 54 by the force of the spring.

Furthermore, although an example has been described in which the driving direction of the vibratory drive unit and the displacement direction of the lens are parallel to each other, the present invention is not limited to the above example. For example, a plurality of vibrator vibrating drive unit of the present invention may be employed to rotate an annular member and a torque thereof may be converted into and retrieved as force in the displacement direction of the lens so that the lens is displaced.

In the present embodiment, although an example has been described in which the vibratory drive unit is used to drive an autofocusing lens of an imaging device, the application example of the present invention is not limited to the above example. For example, the vibratory drive unit may be used to drive a lens holder for displacing a zoom lens.

Accordingly, the vibratory drive unit of the claimed invention may be, in addition to the imaging device for driving the lens, mounted in an interchangeable lens as well. Furthermore, the vibratory drive unit may be used to drive an imaging element and may be used to drive a lens and an imaging element during a shake correction.

Accordingly, an interchangeable lens and an imaging device that are capable of performing stable driving operations can be obtained, or power efficiency of an interchangeable lens or an imaging device can be improved.

Third Embodiment

As a third embodiment, an exemplary configuration of an automatic stage applying the vibratory drive unit of the present invention will be described with reference to FIG. 10.

In the second embodiment, an example of an imaging device has been illustrated; however, the application is not limited to the imaging device and may be used to drive various automatic stages of a microscope and the like. For example, the vibratory drive unit can be applied to drive a stage of a microscope and the like.

Figure 10:
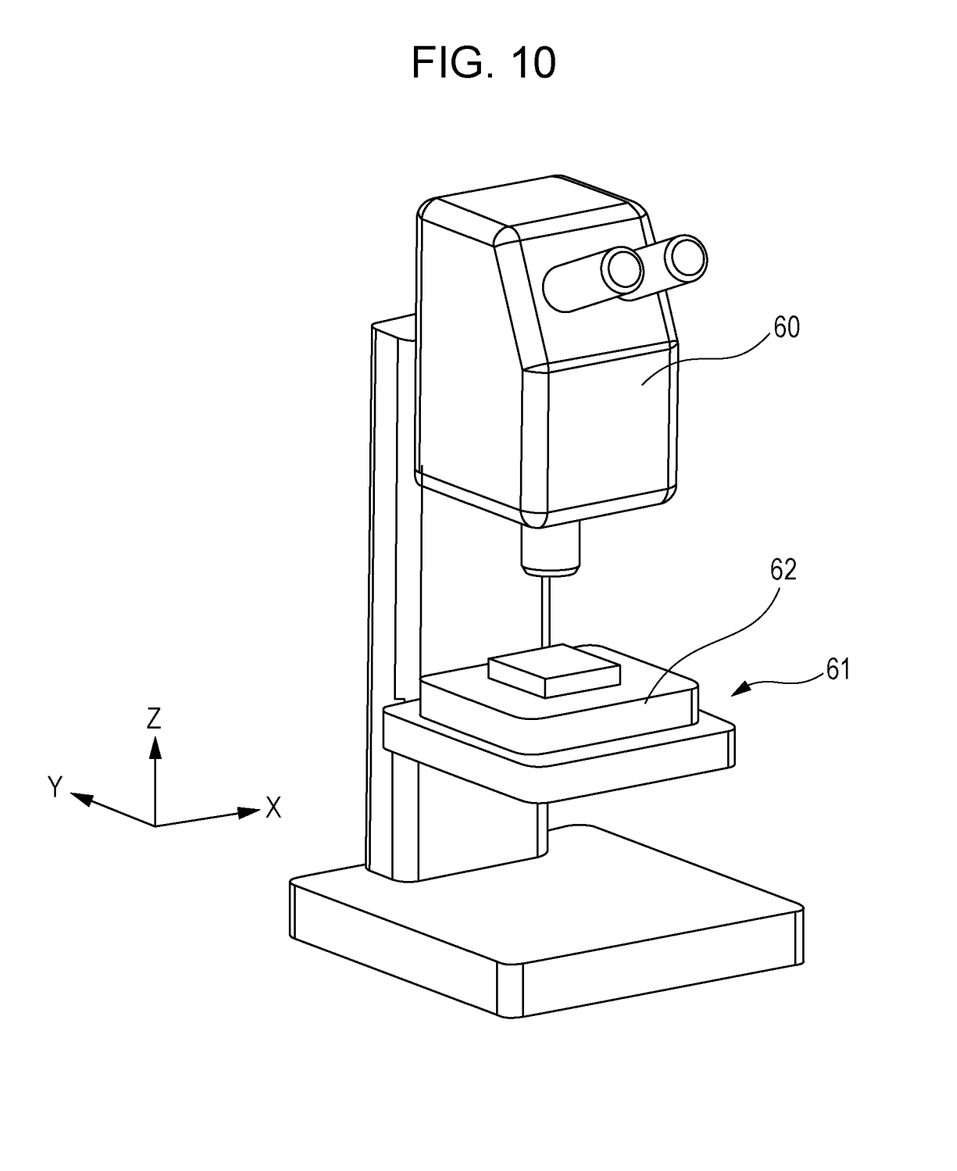
FIG. 10 is a diagram for describing an exemplary configuration of an automatic stage.

FIG. 10 is a perspective view of a microscope illustrating the present embodiment.

The microscope of FIG. 10 includes an imaging unit 60 that is built in with an imaging element and an optical system, and automatic stage 61 including a stage 62 that is provided on a base and that is displaced by the vibratory drive unit.

An object to be observed is placed on the state 62 and an enlarged image is taken by the imaging unit 60. When the area of observation extends in a large area, the stage 62 is displaced by the vibratory drive unit such that the object to be observed is moved in the X direction and the Y direction of FIG. 10 such that a number of photographed images are obtained.

The photographed images can be joined together on the computer (not shown) to obtain a single image that has a high resolution and in which the area of observation is wide.

Accordingly, an automatic stage that is capable of performing stable driving operations can be obtained, or power efficiency of the automatic stage can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-215663, filed Oct. 16, 2013, which is hereby incorporated by reference herein in its entirety.

What is claimed is:

1. A vibrator, comprising:
an electro-mechanical transducer; and
an elastic body that is fixed to the electro-mechanical transducer and that is provided with a projection having a hollow structure,
wherein the projection includes:
a contact portion having a contact surface at a tip;
a wall portion projecting towards an opposite side with respect to the electro-mechanical transducer; and
a connection portion connecting the wall portion and the contact portion to each other, the connection portion having a spring property, and
wherein a cross-sectional area of a root portion of the contact portion is larger than a cross-sectional area of the contact surface.

2. The vibrator according to claim 1, wherein a cross-sectional shape of the contact portion has a substantially trapezoid shape.

3. The vibrator according to claim 1, wherein the hollow structure of the projection is formed in a cylindrical shape.

4. The vibrator according to claim 3, wherein a change in a spring stiffness of the projection in a case in which a thickness of the contact portion is decreased due to wear caused by being in contact with a driven body is 10% or less.

5. The vibrator according to claim 4, wherein a diameter of the root portion of the contact portion is 2 times or more larger than a diameter of the contact surface.

6. The vibrator according to claim 4, wherein in a case in which a diameter of the contact surface is 0.3 mm and a diameter of the root surface constituting the largest diameter of the contact portion is 1.5 mm, a range of decrease in thickness due to wear is in the range of 40 μm or less.

7. The vibrator according to claim 1, wherein the elastic body is configured so that the contact surface is in contact with a driven body.

8. The vibrator according to claim 1, wherein the vibrator is configured so that, by application of an AC voltage to the electro-mechanical transducer, the vibrator and a driven body that is in contact with the contact surface are relatively displaced with respect to each other.

9. The vibrator according to claim 1, wherein the vibrator is configured so that, by application of an AC voltage to the electro-mechanical transducer, an ellipsoidal motion is excited in the projection.

10. The vibrator according to claim 9, wherein in the electro-mechanical transducer, the ellipsoidal motion is excited by two vibration modes.

11. The vibrator according to claim 10, wherein the two vibration modes are a first bending mode and a second bending mode, nodal lines of which are substantially orthogonal to each other.

12. The vibrator according to claim 1, wherein the electro-mechanical transducer has a rectangular shape in a first plane.

13. A vibratory drive unit, comprising:
the vibrator according to claim 1; and
a driven body that is in press-contact with the vibrator.

14. An interchangeable lens, comprising:
a lens;
a lens holder configured to hold the lens; and
the vibratory drive unit according to claim 13 that is provided in the lens holder.

15. An imaging device, comprising:
an imaging element; and
the vibratory drive unit according to claim 13 that is capable of displacing the imaging element.

16. An automatic stage, comprising:
the vibratory drive unit according to claim 13; and
a stage that is capable of being displaced with the vibratory drive unit.

17. A vibratory drive unit, comprising:
a vibrator including an electro-mechanical transducer and an elastic body; and
a movable member configured to contact the vibrator,
wherein the elastic body is provided with a projection protruding at a side opposite to a side at which the electro-mechanical transducer is provided, and a contact portion that protrudes along a direction in which the projection protrudes and configured to contact the movable member is provided to a part of the projection, and
wherein a cross-sectional area of a base of the contact portion is larger than a cross-sectional area of a top of the contact portion.

18. An electronic device comprising the vibratory drive unit according to claim 17.

* * * * *